(12) United States Patent
Shibutani

(10) Patent No.: US 7,928,166 B2
(45) Date of Patent: *Apr. 19, 2011

(54) POLYVINYL ALCOHOL HAVING 1,2-GLYCOL BOND IN SIDE CHAIN AND PROCESS FOR PREPARING THE SAME

(75) Inventor: Mitsuo Shibutani, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 72 days.

This patent is subject to a terminal disclaimer.

(21) Appl. No.: 11/573,961

(22) PCT Filed: Aug. 18, 2004

(86) PCT No.: PCT/JP2004/011834
§ 371 (c)(1),
(2), (4) Date: Feb. 20, 2007

(87) PCT Pub. No.: WO2006/018870
PCT Pub. Date: Feb. 23, 2006

(65) Prior Publication Data
US 2009/0023880 A1    Jan. 22, 2009

(51) Int. Cl.
C08F 8/02 (2006.01)
C08F 22/26 (2006.01)

(52) U.S. Cl. .......... 525/330.6; 139/420 A; 442/327; 524/803; 525/56; 525/60; 525/61; 525/62; 525/329.5; 525/330.3; 525/384; 526/319; 526/321; 526/322; 526/324; 526/325; 526/328; 526/328.5; 526/329; 526/329.5; 526/330; 526/331; 528/272; 528/302; 528/303

(58) Field of Classification Search .......... 526/319, 526/320, 321, 330, 322, 324, 325, 328, 328.5, 526/329, 329.5, 331; 524/803; 139/420 A; 442/327; 525/56, 60, 61, 62, 329.5, 330.3, 525/330.6, 384; 528/272, 302, 303
See application file for complete search history.

(56) References Cited

U.S. PATENT DOCUMENTS

| | | | |
|---|---|---|---|
| 6,090,900 A * | 7/2000 | Turner et al. ............... 526/269 |
| 6,121,400 A * | 9/2000 | Webster et al. ............. 526/333 |
| 6,472,491 B1 * | 10/2002 | Martinez et al. ........... 526/348.8 |
| 7,193,012 B2 * | 3/2007 | Shibutani ..................... 525/56 |
| 2007/0178268 A1 * | 8/2007 | Matsui et al. ............... 428/35.7 |
| 2007/0196679 A1 * | 8/2007 | Moriyama et al. .......... 428/518 |
| 2008/0124678 A1 * | 5/2008 | Tsutsumi et al. ........... 433/199.1 |
| 2008/0280129 A1 * | 11/2008 | Kikuchi et al. ............. 428/330 |

FOREIGN PATENT DOCUMENTS

| | | |
|---|---|---|
| CN | 1276800 | 12/2000 |
| EP | 1443060 A1 * | 8/2004 |
| JP | 2000-313721 | 11/2000 |
| JP | 2000-313721 A | 11/2000 |
| JP | 2002-241433 | 8/2002 |
| JP | 2002-241433 A | 8/2002 |
| JP | 238739/2002 | 8/2002 |
| JP | 2002-284818 | 10/2002 |
| JP | 2004-075866 | 3/2004 |
| JP | 2004-285143 | 10/2004 |
| JP | 2004-285143 A | 10/2004 |
| WO | WO 99/20666 | 4/1999 |

OTHER PUBLICATIONS

International Search Report; PCT/JP2004/011834; Date of Mailing: Nov. 22, 2004.
Supplementary European Search Report; Application No. EP 04 77 1795; Date of Mailing: Apr. 1, 2008.
Notification of Transmittal of Translation of the International Preliminary Report on Patentability; Form PCT/IB/338 mailed May 3, 2007 in international application No. PCT/JP2004/011834.
International Preliminary Report on Patentability; Form PCT/IB/373 issued Apr. 24, 2007 in international application No. PCT/JP2004/011834.
Chinese Official Action mailed Aug. 21, 2009, for Application No. 200480043815.2.
Japanese Official Action mailed Sep. 27, 2007, for Application No. 077211/2003.

* cited by examiner

*Primary Examiner* — Vasu Jagannathan
*Assistant Examiner* — Richard A Huhn
(74) *Attorney, Agent, or Firm* — Antonelli, Terry, Stout & Kraus, LLP.

(57) ABSTRACT

There is disclosed a polyvinyl alcohol having a 1,2-glycol bond in a side chain, and a process for preparing the polyvinyl alcolnol wherein there is no generation of dimethyl carbonate hence no need of a process of eliminating dimethyl carbonate in the recovering process of waste liquid after hydrolysis. Also, even when an introduction amount of 1,2-glycol bonds is increased, there is no deterioration of solubility in a hydrolyzing solution (methanol) of a copolymer (paste) before hydrolysis. Further, water-insolubility is not lowered even in experiencing thermal history. Specifically, there is provided a polyvinyl alcohol having a 1,2-glycol bond in a side chain obtained by hydrolyzing a copolymer of a vinyl ester monomer and a compound shown in the formula (1) wherein the hydrolysis degree of the polyvinyl alcohol is at least 60% by mol.

7 Claims, 3 Drawing Sheets

POLYVINYL ALCOHOL HAVING 1,2-GLYCOL BOND IN SIDE CHAIN AND PROCESS FOR PREPARING THE SAME

RELATED APPLICATION

This application is a U.S. national phase application of international application no. PCT/JP2004/011834 filed Aug. 18, 2004.

TECHNICAL FIELD

The present invention relates to a polyvinyl alcohol having a 1,2-glycol bond in a side chain and a process for preparing the same.

BACKGROUND ART

Conventionally, polyvinyl alcohol has been widely used in emulsifiers, suspending agents, surfactants, fiber processing agents, various kinds of binders, paper processing agents, adhesives, films and the like by utilizing film forming characteristics (such as film forming property, oil resistance and strength), water solubility and the like. In addition, it is generally used as an aqueous solution except for special cases.

According to intended uses, polyvinyl alcohols with various degrees of hydrolysis are used, in the case of using a polyvinyl alcohol with a relatively high degree of hydrolysis, when it is dissolved in water to obtain an aqueous solution, a viscosity of the aqueous solution increases with time when a water temperature is low such as during wintertime to result in poor fluidity, and in an extreme case, the aqueous solution gels and loses fluidity completely, which causes serious problems.

To solve these problems, there is proposed a polyvinyl alcohol having a 1,2-glycol bond in a side chain obtained by hydrolysis/decarbonating a copolymer of a vinyl ester monomer and vinyl ethylene carbonate (see JP-A-2002-241433). The polyvinyl alcohol was excellent in high-speed coating and adhesion performance.

This polyvinyl alcohol is excellent in the above-mentioned various physical properties, however, vinyl ethylene carbonate is used to introduce 1,2-glycol bonds in a high modification amount (e.g. at least 7% by mol) in the polyvinyl alcohol, in this case, in hydrolysis of polyvinyl acetate to which vinyl ethylene carbonate is introduced and in a process of eliminating unreacted vinyl acetate monomers from polymerized paste of polyvinyl acetate to which vinyl ethylene carbonate is introduced, solubility of the resin in solvents such as methanol tends to be lowered, thus there was a limitation of the modification amount in a preparation process such as hydrolysis conducted with ordinary solvents industrially generally used. Also, in deriving vinyl ethylene carbonate into diol by hydrolysis with alkali, there remained a problem that byproducts such as dimethyl carbonate contaminated in a solvent recovery system must be treated.

DISCLOSURE OF INVENTION

As a result of intensive studies on the above problems, the above-described problems have been solved by a polyvinyl alcohol having a 1,2-glycol bond in a side chain obtained by hydrolyzing a copolymer of a vinyl ester monomer and a compound shown in the following formula (1), further, it was found that water solubility and standing stability of the polyvinyl alcohol can be significantly improved, and the present invention reached the completion.

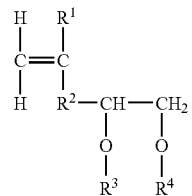

(wherein $R^1$ is a hydrogen atom or an alkyl group, $R^2$ is a single bond or an alkylene group having 1 to 3 carbon atoms which may have an alkyl group, each of $R^3$ and $R^4$ are independently a hydrogen atom or $R^5$—CO— (wherein $R^5$ is an alkyl group)).

Also, the present invention is characterized in that problem that a polyvinyl alcohol with a degree of hydrolysis of less than 99.0% by mol (partially hydrolyzed material) in experiencing thermal history can be solved by using the compound shown in the above described formula (1).

Namely, the present invention relates to a polyvinyl alcohol having a 1,2-glycol bond in a side chain obtained by hydrolyzing a copolymer of a vinyl ester monomer and a compound shown in the formula (1).

The present invention also relates to a process for preparing a polyvinyl alcohol having a 1,2-glycol bond in a side chain, wherein the copolymer of a vinyl ester monomer and a compound shown in the formula (1) is hydrolyzed.

It is preferable that the degree of hydrolysis is at least 99.0% by mol or less than 99.0% by mol.

It is more preferable that the copolymerization ratio of the compound shown in the formula (1) is 0.1 to 40% by mol.

BEST MODE FOR CARRYING OUT THE INVENTION

Figure 1:
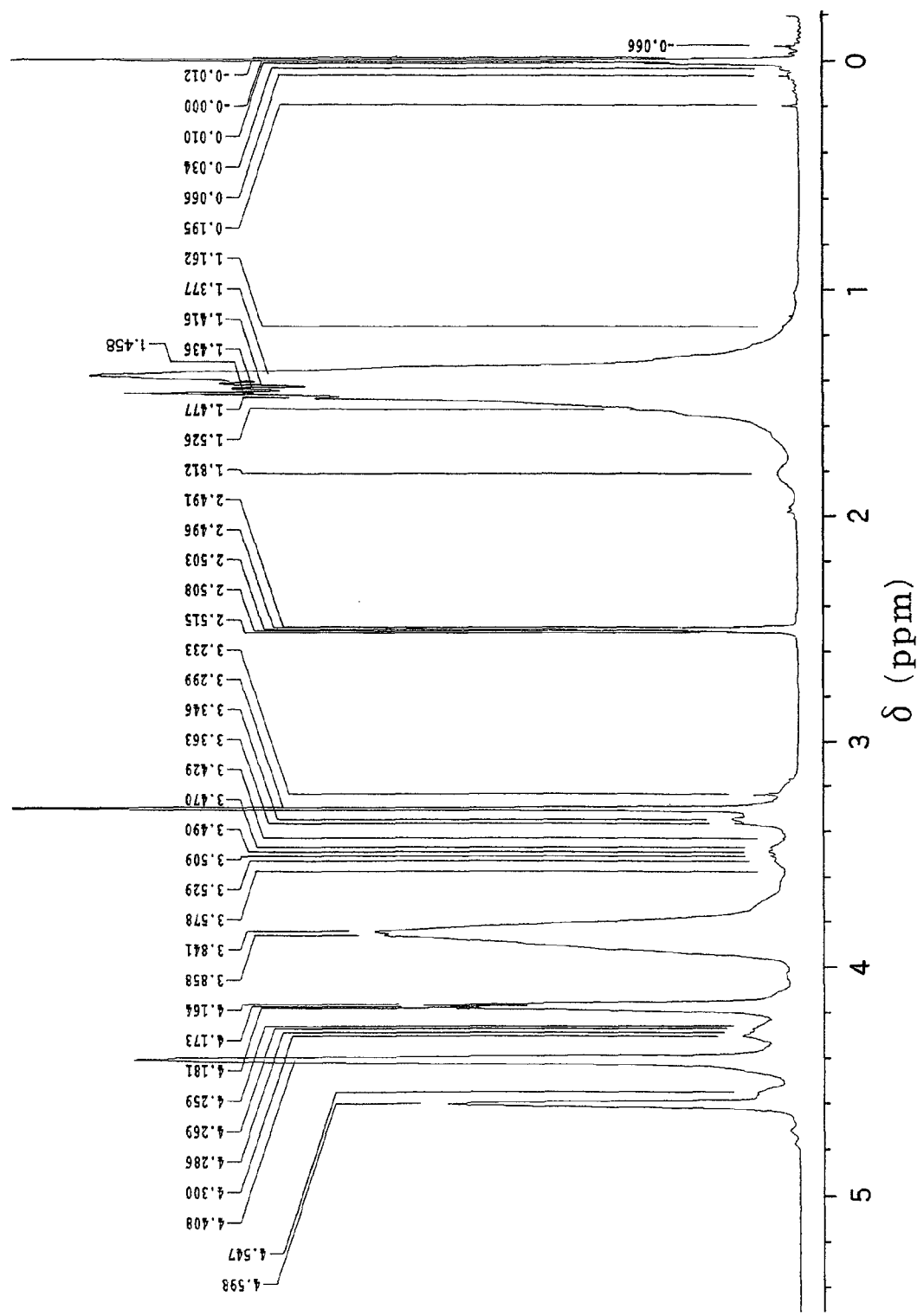
FIG. 1 is a $^1$H-NMR chart of the polyvinyl alcohol (I) obtained in Example 1.

The present invention relates to a polyvinyl alcohol having a 1,2-glycol bond in a side chain.

The polyvinyl alcohol of the present invention is obtained by hydrolyzing a copolymer of a vinyl ester monomer and a compound shown in the following formula (1),

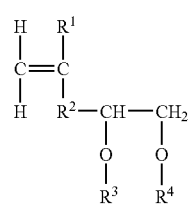

(wherein, $R^1$ is a hydrogen atom or an alkyl group, preferably a methyl group, an ethyl group or a butyl group, $R^2$ is a single bond or an alkylene group having 1 to 3 carbon atoms which may have an alkyl group, preferably a methyl group, an ethyl group or a butyl group, each of $R^3$ and $R^4$ are independently a hydrogen atom or $R^5$—CO— (wherein $R^5$ is an alkyl group, preferably a methyl group, a propyl group, a butyl group, a hexyl group or an octyl group)).

Examples of the compound shown in the formula (1) are 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-petene, 4,5-diacyloxy-3-methyl-1-petene, 5,6-dihydroxy-1-hexene and 5,6-diacyloxy-1-hexene. Among these, 3,4-diacyloxy-1-butene is preferable from the viewpoints that it is excellent in copolymerization reactivity and industrial handling, and among 3,4-diacyloxy-1-butene, 3,4-diacetoxy-1-butene is more preferable.

Additionally, 3,4-diacyloxy-1-butene can be commercially available from Eastman Chemical Co., Ltd. and Acros Inc.

Examples of the vinyl ester monomer are vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. Of these, vinyl acetate is preferably used from the viewpoint of economy.

Also, in the present invention, monomers other than the above described copolymer component can be copolymerized within the range that the effects of the present invention are not lost, for example, about 0.5 to 10% by mol.

Examples of such monomers are olefins such as ethylene, propylene, isobutylene, α-octene, α-dodecene, α-octadecene; unsaturated acids such as acrylic acid, methacrylic acid, crotonic acid, maleic acid, maleic anhydride, and itaconic acid or salts, mono- or di-alkyl esters thereof; nitriles such as acrylonitrile and methacrylonitrile; amides such as diacetoneacrylamide, acrylamide and methacrylamide; olefin sulfonic acid such as ethylene sulfonic acid, allyl sulfonic acid, and methacryl sulfonic acid or salts thereof; alkyl vinyl ethers; dimethylallyl vinyl ketone, N-vinyl pyrrolidone, vinyl chloride, vinylidene chloride; polyoxyalkylene(meth)allyl ether such as polyoxyethylene(meth)allyl ether and polyoxypropylene(meth)ally ether; polyoxyalkylene(meth)acrylate such as polyoxyethylene(meth)acrylate and polyoxypropylene(meth)acrylate; polyoxyalkylene(meth)acrylamide such as polyoxyethylene(meth)acrylamide and polyoxypropylene (meth)acrylamide; polyoxyethylene (1-(meth)acrylamide-1,1-dimethylpropyl)ester, polyoxyethylene vinyl ether, polyoxypropylene vinyl ether, polyoxyethylene allylamine, polyoxypropylene allylamine, polyoxyethylene vinylamine and polyoxypropylene vinylamine.

Further, examples are cation group-containing monomers such as N-acrylamidomethyl trimethylammonium chloride, N-acrylamidoethyl trimethylammonium chloride, N-acrylamidopropyl trimethylammonium chloride, 2-acryloxyethyl trimethylammonium chloride, 2-methacryloxyethyl trimethylammonium chloride, 2-hydroxy-3-methacryloyl oxypropyl trimethylammonium chloride, allyl trimethylammonium chloride, methallyl trimethylammonium chloride, 3-butene trimethylammonium chloride, dimethyl diallyl ammonium chloride and diethyl diallyl ammonium chloride, and acetoacetyl group-containing monomers.

As a polymerization method of copolymerizing a vinyl ester monomer with the compound shown in the formula (1) (further with other monomers), it is not particularly limited, and known methods such as bulk polymerization, solution polymerization, suspension polymerization, dispersion polymerization or emulsion polymerization can be employed, but usually solution polymerization is conducted.

The method for charging the monomer components when copolymerizing is not particularly limited and the components can be added all at once, in portions or continuously. A dropping polymerization is preferable, a polymerization according to the HANNA method is particularly preferable from the viewpoints of physical properties such that the compound shown in the formula (1) is uniformly distributed into a molecular chain of polyvinyl ester polymer, reactivity with crosslinking agents is improved, and a melting point of polyvinyl alcohol is lowered.

The solvent used for copolymerization is usually lower alcohols such as methanol, ethanol, isopropyl alcohol, propanol and butanol, and ketones such as acetone and methyl ethyl ketone. Methanol is suitably used from an industrial point of view.

An amount of the solvent that is used can be selected accordingly in view of the chain transfer constant of the solvent, depending on the desired polymerization degree of the copolymer. For example, when methanol is the solvent, the amount is selected from the range of S (solvent)/M (vinyl ester monomer)=0.01 to 10 (weight ratio), preferably 0.05 to 3 (weight ratio).

A polymerization catalyst is used in the copolymerization, and examples of the polymerization catalyst are, for instance, known radical polymerization catalysts such as azobisisobutyronitrile, acetyl peroxide, benzoyl peroxide, lauryl peroxide, and radical polymerization catalysts active at low temperatures such as azobisdimethylvaleronitrile and azobismethoxydimethylvaleronitrile.

The amount of the polymerization catalyst that is used depends on the type of catalyst and cannot be categorically determined, but is selected arbitrarily according to the polymerization rate. For example, in the case that azobisisobutyronitrile or acetyl peroxide is used, the amount is preferably 0.01 to 0.2% by mol, particularly preferably 0.02 to 0.15% by mol, based on the vinyl ester monomer.

Also, the reaction temperature of the copolymerization reaction is preferably selected from the range of 40° C. to the boiling point depending on the solvent that is used and the pressure.

In the present invention, a copolymerization ratio of the compound shown in the formula (1) is not particularly limited, and may be determined in accordance with an introduction amount of 1,2-glycol bonds described below.

Then, the obtained copolymer is hydrolyzed but the hydrolyzing is carried out in a state in which the obtained copolymer is dissolved in alcohol or alcohol containing water, using alkali catalyst or acid catalyst. Examples of the alcohol are methanol, ethanol, propanol and tert-butanol and methanol is preferably used in particular. The concentration of the copolymer in the alcohol is suitably selected according to the viscosity of the system, but usually selected from a range of 10 to 60% by weight. Examples of the catalyst used for the hydrolyzing are alkali catalysts such as the hydroxides of alkali metal and alcoholates including sodium hydroxide, potassium hydroxide, sodium methylate, sodium ethylate, potassium methylate and lithium methylate; and acid catalysts such as sulfuric acid, hydrochloric acid, nitric acid, methanesulfonic acid, zeolite and cation-exchange resin.

The amount of the hydrolyzing catalyst is suitably selected according to the hydrolyzing method, the desired degree of hydrolyzing and the like, but when an alkali catalyst is used, the amount is suitably 0.1 to 30 millimoles and preferably 2 to 17 millimoles, based on 1 mole of the total amount of vinyl ester monomer and the compound shown in the formula (1).

Also, a reaction temperature of the hydrolysis reaction is not particularly limited, but preferably 10 to 60° C., more preferably 20 to 50° C.

The polyvinyl alcohol of the present invention is prepared by simultaneous conversion of an ester part of a vinyl ester monomer and an acyloxy part of the compound shown in the formula (1) into hydroxyl groups, it has a feature that byproduct such as dimethyl carbonate is not generated, which is a drawback in the case of using vinyl ethylene carbonate.

In the present invention, the average polymerization degree of the polyvinyl alcohol (measured in accordance with JIS K6726) is 150 to 4000, preferably 300 to 2600, and particularly preferably 500 to 2200. When the average polymerization degree is less than 150, mechanical strength tends to be lowered in the use for film application, when the average degree of polymerization exceeds 4000, it tends to be difficult to introduce many 1,2-glycol bonds.

Also, the hydrolysis degree of the polyvinyl alcohol is preferably at least 60% by mol, more preferably at least 70% by mol, still more preferably at least 80% by mol, and particularly preferably at least 90% by mol. When the hydrolysis degree is less than 60% by mol, water solubility tends to be lowered.

Additionally, a hydrolysis degree in the present invention is expressed as a conversion rate (% by mol) of the total amount of the ester part of the vinyl ester monomer and the acyloxy part of the compound shown in the formula (1) into hydroxyl groups (in the hydrolysis reaction, an acyloxy part of the compound shown in the formula (1) is almost completely hydrolyzed in a degree of hydrolysis of 70 to 80% by mol.

An upper limit of the hydrolysis degree comparatively varies according to applications. In the case of using for an adhesive for aqueous vinyl urethane, a paper processing agent (sizing agent) or various kinds of silica binders for an ink receiving layer and a gloss layer in an ink jet paper, it is preferably less than 99.0% by mol. For the application of acid or alkali packaging materials of agricultural chemicals, detergents and the like, the hydrolysis degree is preferably at least 99.0% by mol from the viewpoint of exhibiting a characteristic reactive effect that water solubility of a film hardly changes with time.

Additionally, the amount of 1,2-glycol bonds introduced in a polyvinyl alcohol is not particularly limited, it is preferably 0.1 to 40% by mol, more preferably 0.5 to 25% by mol, and further preferably 1 to 20% by mol. When the introduction amount is less than 0.1% by mol, reactivity with a crosslinking agent is low in the case of using the crosslinking agent etc together, also, viscosity stability when formed to be an aqueous solution tends to be lowered, further, the coating property also tends to be lowered in the case where the aqueous solution is used in a high-speed coating application. When the introduction amount exceeds 40% by mol, the polymerization degree tends to become too low.

Particularly, in the present invention, as described above, even in the case where the amount of 1,2-glycol bonds is introduced as high as at least 7% by mol, there is no problem caused in industrial practice, the preparation thereof can be easily conducted, furthermore, a polyvinyl alcohol with a high introduction amount decreases in crystallinity to result in increasing in water solubility, also stability of an aqueous solution of the polyvinyl alcohol is excellent, the aqueous solution of the polyvinyl alcohol is low foaming, and a film obtained from the aqueous polyvinyl alcohol is not lowered in water solubility even if left under an alkali atmosphere for a long period of time, therefore, it is useful for water soluble packing material applications such as package for alkali detergent. Also, on the other hand, 1,2-glycol bond has a primary hydroxyl group, the introduction amount can be largely increased, so that adhesion strength can be significantly improved when it is used in application of an aqueous vinyl urethane adhesive, it is useful as adhesives for woodwork, particularly for softwood plywood. Also, it has a high interaction with silica such as colloidal silica and fumed silica, it is also suitable for a gloss layer for ink jet.

The polyvinyl alcohol of the present invention has a low melting point even having a high degree of hydrolysis of approximately 99% by mol, thus, when the polyvinyl alcohol of the present invention is blended with a compatiblizer (various kinds of acid anhydride modified olefin resin such as maleic anhydride, into olefin resin such as an ethylene-vinyl acetate copolymer (content of vinyl acetate of approximately 1 to 40% by weight), melt blending is easily carried out. Also, it has usefulness such that, for example, by blending about 20% by weight of polyvinyl alcohol of the present invention with the ethylene-vinyl acetate copolymer, a film for agriculture with the same warmth retaining property as a vinyl chloride film can be obtained.

The polyvinyl alcohol having a 1,2-glycol bond in a side chain of the present invention has low crystallinity even with a high hydrolysis degree, so that it has high velocity of dissolution into water, exhibits very excellent effect on standing stability of the aqueous solution, further, because a hydroxyl group is present as a primary alcohol, it has also high reactivity with a crosslinking agent such as an isocyanate compound, polyamide epichlorohydrin, glyoxal, melamine resin, methylolmelamine, methylolated bisphenol S, and dimethylolated urea. As the isocyante compound, isocyanate having at least two isocyanate groups in a molecule is useful, examples are, for instance, tolylene diisocyanate (TDI), hydrogenated TDI, trimethylolpropane-TDI adduct (e.g. "Desmodur (registered trademark) L" available from Bayer AG), triphenylmethane triisocyanate, methylenebisdiphenyl isocyanate (MDI), hydrogenated MDI, polymerized MDI, hexamethylene diisocyanatae, xylylene diisocyanate, 4,4-dicyclohexylmethane diisocyanate and isophorone diisocyanate. In addition, an other example is a prepolymer having an isocyante group at an end group previously polymerized with excess polyisocyanate in polyol. A composition ratio of the isocyanate compound is preferably 0.1 to 2 of mole ratio of an isocyanate group to a hydroxyl group (NCO/OH). Also, it has a favorable coating property without increasing viscosity under high shear at high speed coating. Furthermore, it has high reactivity with aldehydes in butyralizing and acetalizing, a butyral resin with high flexibility can be obtained.

The polyvinyl alcohol of the present invention can be used in various kinds of applications, a part of the applications are described above, and specific examples are described in the following.

(1) Adhesive Application

Adhesives tackifiers and re-wetting agents for wood, paper, aluminum foil and plastic, binder for non-woven fabrics, various kinds of building material binders for a plaster board and a fiber board, various kinds of binders for powder granulation, additives for cement and mortar, hot melt type adhesives, pressure sensitive adhesives, and fixing agents of anionic paint.

(2) Molded Article Application

Fibers, films (particularly easy-water-soluble films for wrapping goods such as agriculture chemicals, detergents, clothing for laundry, additives for civil engineering, bactericides, dyes and pigments: the hydrolysis degree of the polyvinyl alcohol is preferably at least 65% by mol), raw films for polarizing films (the amount of 1,2-glycol bond is preferably 0.2 to 2% by mol and the polymerization degree is preferably at least 2000), sheets, pipes, tubes, leakage protecting films, temporary films, chemical laces and water soluble fibers.

(3) Coating Agent Application

Clear coating agents for paper, pigment coating agents for paper, sizing agents for paper, sizing agents for fiber products, adhesive pastes for wrap yarn, fiber processing agents, leather finishing agents, paints, defogging agents, metal corrosion proofing agents, lubricants for zinc plating, anti-static agents, conducting agents and temporary paints.

(4) Emulsifier Application

Emulsifiers for emulsion polymerization of ethylenically unsaturated compounds, butadiene compounds and various kinds of acrylic monomers; and post emulsifiers for hydrophobic resins such as polyolefin, polyester resin and the like, epoxy resin, paraffin and bitumen.

(5) Suspending Agent Application

Pigment dispersion stabilizers for paints, black writing fluid, aqueous color ink and adhesives; and dispersion stabilizers for suspension polymerization of various kinds of vinyl compounds such as vinyl chloride, vinylidene chloride, styrene, (meth)acrylate and vinyl acetate.

(6) Blending Agent for Hydrophobic Resin Application

Antistatic agents and hydrophilicity imparting agents for hydrophobic resin; and additives for molded articles such as conjugate fibers, films (especially, films applied for agriculture can be provided with warmth retaining property).

(7) Thickener Application

Thickeners for various kinds of aqueous solutions and emulsions.

(8) Coagulant Application

Coagulants for aqueous suspension and dissolved matter, and filtering agents for pulp and slurry.

(9) Soil Improving Agent Application

(10) Photosensitizing Agent, Electro-Sensitive Application and Photosensitive Resin

(11) Ion-Exchange Resin, Ion-Exchange Membrane, Chelate Exchange Resin, and Others Among the above descriptions, usefulness in applications of (1) to (5) is particularly expected.

Additionally, in developing various applications, it is preferable to add a plasticizer according to necessity, and examples of the plasticizer are polyhydric alcohol of tervalent to hexavalent (glycerin, trimethylolpropane, diglycerin, pentaerythritol, xylose, arabinose, ribulose, sorbitol and the like), various alkylene oxides (ethylene oxide, propylene oxide, mixed adduct of ethylene oxide and propylene oxide, and the like).

EXAMPLES

The present invention is specifically explained below with reference to Examples, however the present invention is not limited to the following examples.

Additionally, "part" and "%" represent weight standards unless indicated otherwise.

Example 1

Into a reactor equipped with a reflux condenser, a dropping funnel and a stirrer, 1300 g of vinyl acetate, 650 g of methanol and 78.1 g (3% by mol based on the charged vinyl acetate) of 3,4-diacetoxy-1-butene were charged, 0.06% by mol (based on the charged vinyl acetate) of azobisisobutyronitrile was added thereto, and polymerization was carried out increasing a temperature under nitrogen flow while stirring.

Then, at a point that a polymerization ratio of vinyl acetate reached 87.5%, 50 ppm (based on the charged vinyl acetate) of m-dinitrobenzene was charged thereto as a polymerization inhibitor to complete polymerization. Subsequently, by a method of blowing methanol vapor, unreacted vinyl acetate monomers were removed outside the system to obtain the methanol solution of the copolymer.

Then, the solution was diluted with methanol to adjust a concentration at 40%, charged into a kneader, while maintaining a temperature of the solution at 40° C., a 2% methanol solution of sodium hydroxide was added for its ratio to be 8% by mmol based on the total amount of vinyl acetate and 3,4-diacetoxy-1-butene to conduct hydrolysis. The hydrolyzed product was separated by filteration at the point of time when the hydrolyzed product was precipitated to form particles as hydrolysis proceeded, sufficiently washed with methanol, dried in a hot air dryer to obtain the polyvinyl alcohol.

In the above preparation of the polyvinyl alcohol, waste liquid after completion of hydrolysis was examined for presence of byproduct using GC-MS ("597N GC/MSD" system manufactured by Agilent Technologies, Inc.) in the following conditions.

(Column Conditions)
Column: HP-WAX (crosslinked polyethyleneglycol) capillary column
Column temperature: fixed at 40° C. for 5 min, raising a temperature at 10° C./min, allowed to stand at 240° C. for 10 min
Inlet temperature: 240° C.
Carrier gas: He
Column flow rate: 1.0 ml/min
(MS Part Conditions)
Apparatus used: "5973MSD" system manufactured by Agilent Technologies, Inc.
Mass range: 10 to 600
Threshold: 20
Scan/sec.: 2.54

As a result, dimethyl carbonate was not detected. Also, any salt other than sodium acetate was not detected.

The hydrolysis degree of the obtained polyvinyl alcohol (I) was analyzed as an amount of alkali consumption required for hydrolysis of residual vinyl acetate and residual 3,4-diacetoxy-1-butene to find 99.5% by mol, the average polymerization degree was analyzed in accordance with JIS K 6726 to find 870. Also, the viscosity of the polyvinyl alcohol in a 4% aqueous solution was measured by a Hoppler viscometer to find 8.6 mPa·s (20° C.), the introduction amount of 1,2-glycol bonds was measured by $^1$H-NMR (internal standard substance: tetramethylsilane, solvent: d6-DMSO) and calculated to be 3.1% by mol. Additionally, "AVANCE DPX400" manufactured by Bruker Japan Co., Ltd. was used for NMR measurement.

Figure 2:
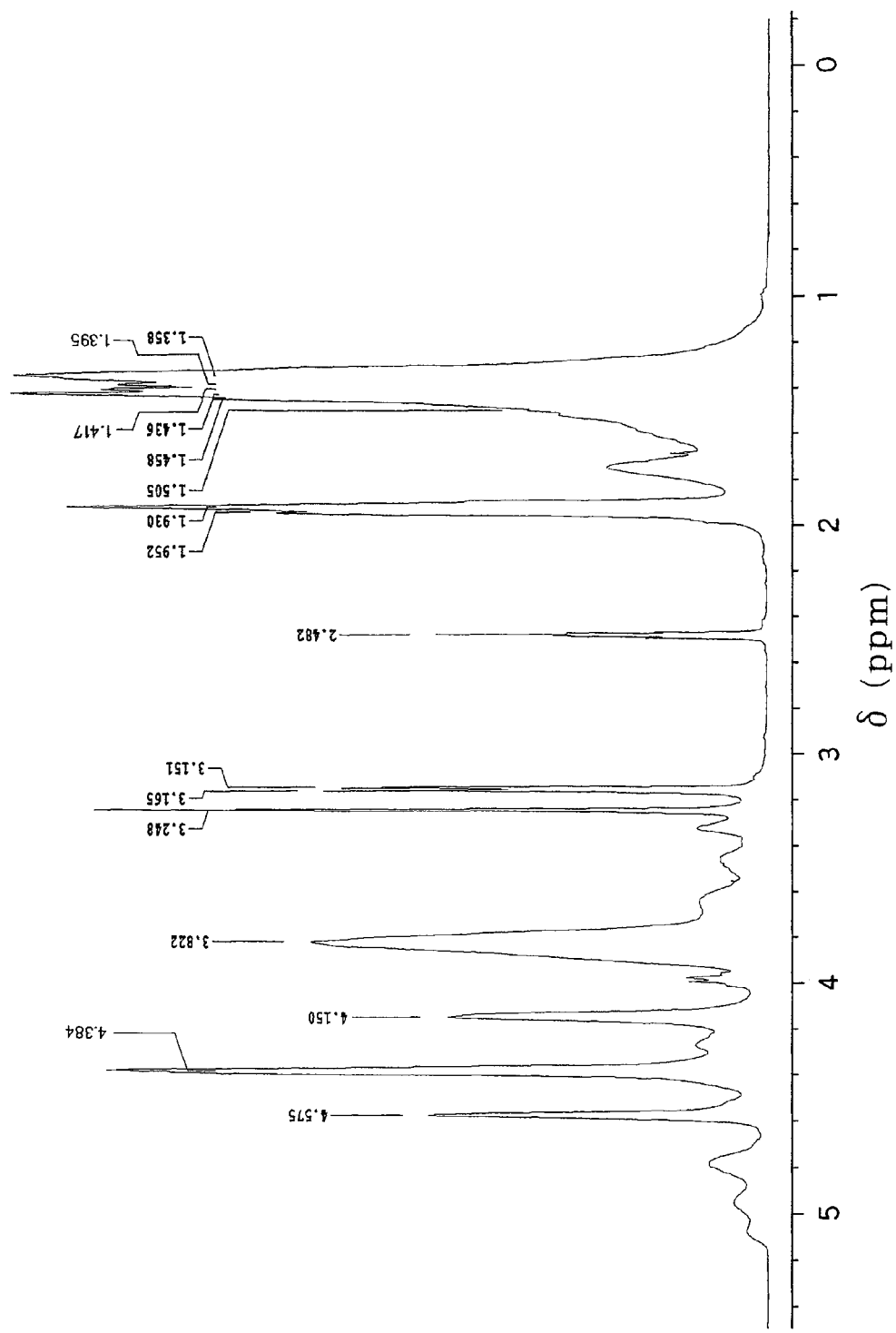
FIG. 2 is a $^1$H-NMR chart of the polyvinyl alcohol (II) obtained in Example 1.

[$^1$H-NMR] (see FIG. 1)
1.2 to 1.5 ppm: Methylene proton
1.8 ppm: Methine proton (due to denaturalization)
3.5 ppm: Methylene proton of primary methylol
3.82 to 3.84 ppm: Methine proton
4.13 to 4.6 ppm: Hydroxyl group
4.25 ppm: Hydroxyl group of diol Also, polyvinyl alcohol (II) [partly hydrolyzed product (the hydrolysis degree of 84.2% by mol)] was obtained by sampling in a process of hydrolysis, $^1$H-NMR chart of the polyvinyl alcohol (II) (solvent: d6-DMSO) was as follows.
[$^1$H-NMR] (see FIG. 2)
1.36 to 1.8 ppm: Methylene proton
1.93 to 1.95 ppm: Methyl proton
3.5 ppm: Methylene proton of primary methylol
3.8 ppm: Methine proton 4.15 to 4.57 ppm: Hydroxyl group
4.3 ppm: Hydroxyl group of diol
4.7 to 5.2 ppm: Methine proton The obtained polyvinyl alcohols (I) and (II) were evaluated as follows.

(Solubility)

The obtained polyvinyl alcohol was dried at 150° C. for 3 hours, after a 10% aqueous solution was prepared, the aqueous solution was filtered through a 400-mesh metal net, the residue of the filtration was measured and evaluated as follows. The evaluation results are shown in Table 1.

◯: residue of filtration is less than 0.005%
Δ: residue of filtration is at least 0.005% to not more than 0.01%
x: residue of filtration is more than 0.01%

Example 2

Into a reactor equipped with a reflux condenser, a dropping funnel and a stirrer, 1300 g of vinyl acetate, 190 g of methanol and 60.5 g (2.28% by mol based on the charged vinyl acetate) of 3,4-diacetoxy-1-butene (B) were charged, 0.06% by mol (based on the charged vinyl acetate) of azobisisobutyronitrile was added thereto. Temperature was raised under nitrogen flow while stirring and polymerization was started at 67° C., simultaneously, 116 ml of a 5.4% methanol solution of 3,4-diacetoxy-1-butene was uniformly added dropwise up to a polymerization ratio of 85.3%.

The polymerization was terminated at the point that a polymerization ratio of vinyl acetate reached 85.3%, subsequently, by a method of blowing methanol vapor, unreacted vinyl acetate monomers were removed outside the system to obtain the methanol solution of the copolymer.

Then, the solution was diluted with methanol to adjust a concentration at 40%, charged into a kneader, while maintaining a temperature of the solution at 40° C., a 2% methanol solution of sodium hydroxide was added for its ratio to be 9% by mmol based on the total amount of vinyl acetate and 3,4-diacetoxy-1-butene to conduct hydrolysis. The hydrolyzed product was separated by filteration at the point of time when the hydrolyzed product was precipitated to form particles as hydrolysis proceeded, sufficiently washed with methanol, dried in a hot air dryer to obtain the polyvinyl alcohol.

In the above preparation of the polyvinyl alcohol, waste liquid after completion of the hydrolysis was examined in the same method as in Example 1 to detect no dimethyl carbonate.

The hydrolysis degree of the obtained polyvinyl alcohol (I) was analyzed as an amount of alkali consumption required for hydrolysis of residual vinyl acetate and 3,4-diacetoxy-1-butene to find 99.6% by mol, the average degree of polymerization was analyzed in accordance with JIS K 6726 to find 1320. Also, the viscosity of the polyvinyl alcohol in a 4% aqueous solution was measured by a Hoppler viscometer to find 18.7 mPa·s (20° C.), the introduction amount of 1,2-glycol bonds was measured by $^1$H-NMR (internal standard substance: tetramethylsilane, solvent: d6-DMSO) and calculated to be 3.2% by mol. Also, the polyvinyl alcohol (II) [partly hydrolyzed product (hydrolysis degree of 95.0% by mol)] was obtained by sampling in a process of hydrolysis. The obtained polyvinyl alcohols (I) and (II) were evaluated in the same manner as in Example 1. The evaluation results are shown in Table 1.

Example 3

Into a reactor equipped with a reflux condenser, a dropping funnel and a stirrer, 1000 g of vinyl acetate (A), 50 g of methanol and 3,4-diacetoxy-1-butene (6% by mol based on the charged vinyl acetate) were charged, 0.03% by mol (based on the charged vinyl acetate) of azobisisobutyronitrile was added thereto, and polymerization was carried out increasing a temperature under nitrogen flow while stirring. At a point that a polymerization ratio of vinyl acetate reached 72%, a polymerization inhibitor was charged thereto to terminate polymerization. Subsequently, by a method of blowing methanol vapor, unreacted vinyl acetate monomers were removed outside the system to obtain the methanol solution of the copolymer.

Then, the solution was diluted with methanol to adjust a concentration at 40%, charged into a kneader, while maintaining a temperature of the solution at 40° C., a 2% methanol solution of sodium hydroxide was added for its ratio to be 8% by mmol based on the total amount of vinyl acetate and 3,4-diacetoxy-1-butene to conduct hydrolysis. As the hydrolysis proceeded, the hydrolyzed product was separated out and became particles at last. The obtained polyvinyl alcohol was collected by filtration, sufficiently washed with methanol, and dried in a hot air dryer to obtain the polyvinyl alcohol.

Figure 3:
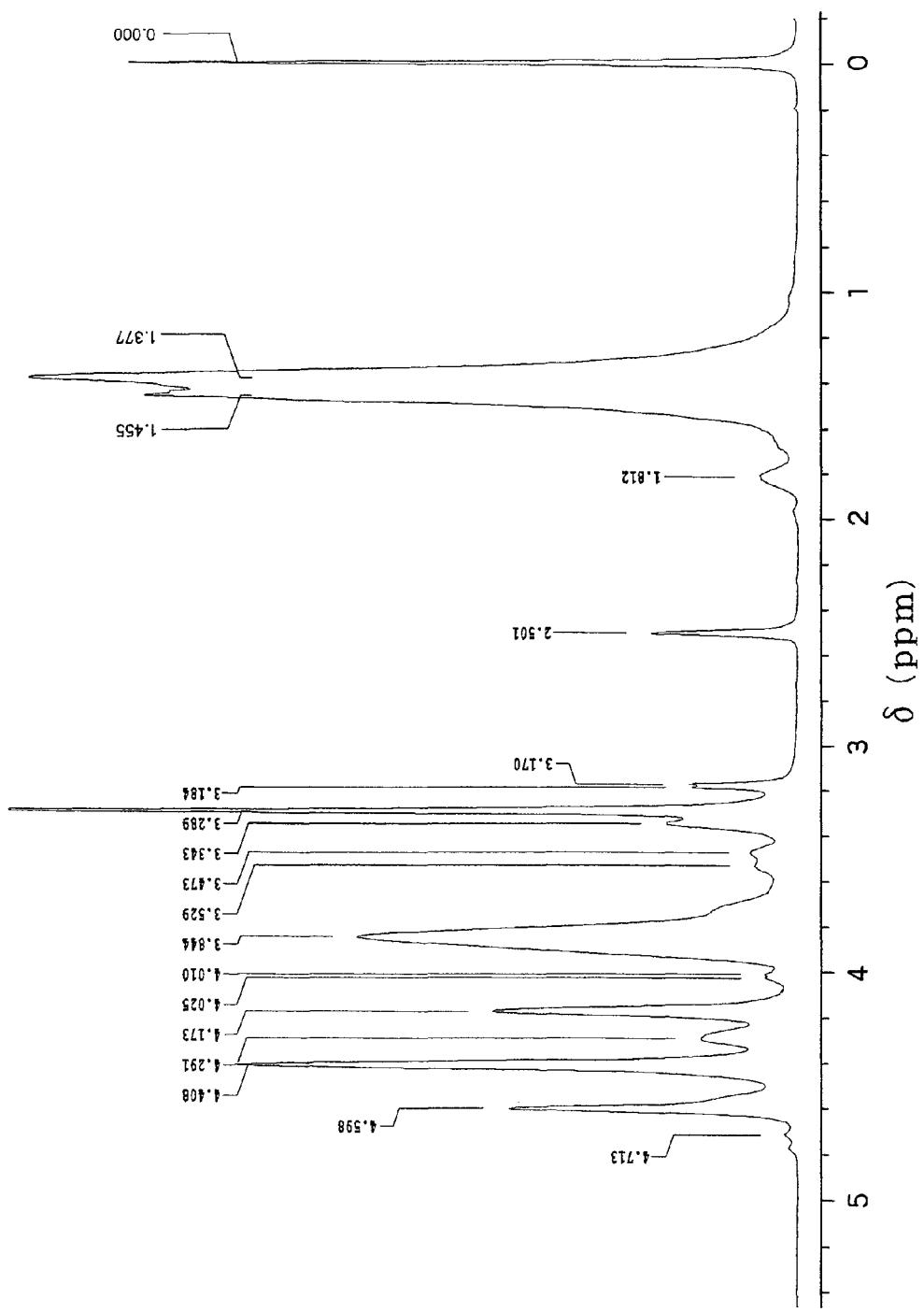
FIG. 3 is a $^1$H-NMR chart of the polyvinyl alcohol (I) obtained in Example 3.

The hydrolysis degree of the obtained polyvinyl alcohol (I) was analyzed as an amount of alkali consumption required for hydrolysis of residual vinyl acetate and 3,4-diacetoxy-1-butene to find 99.5% by mol, the average polymerization degree was analyzed in accordance with JIS K 6726 to find 1450. Also, the viscosity of the polyvinyl alcohol in a 4% aqueous solution was measured by a Hoppler viscometer to find 18.6 mPa·s (20° C.), an introduction amount of 1,2-glycol bonds was measured by $^1$H-NMR (internal standard substance: tetramethylsilane, solvent: d6-DMSO; see FIG. 3) and calculated to be 6.2% by mol. Also, the polyvinyl alcohol (II) [partly hydrolyzed product (hydrolysis degree of 87.8% by mol)] was obtained by sampling in a process of hydrolysis. The obtained polyvinyl alcohols (I) and (II) were evaluated in the same manner as in Example 1. The evaluation results are shown in Table 1.

Example 4

Into a reactor equipped with a reflux condenser, a dropping funnel and a stirrer, 1000 g of vinyl acetate, 50 g of methanol and 3,4-diacetoxy-1-butene (15% by mol based on the charged vinyl acetate) were charged, 0.06% by mol (based on the charged vinyl acetate) of azobisisobutyronitrile was added thereto, and polymerization was carried out increasing a temperature under nitrogen flow while stirring. At a point that a polymerization ratio of vinyl acetate reached 70%, a polymerization inhibitor was charged to terminate the polymerization. Subsequently, by a method of blowing methanol vapor, unreacted vinyl acetate monomers were removed outside the system to obtain a methanol solution of the copolymer.

Then, the solution was diluted with methanol to adjust a concentration at 40%, charged into a kneader, while maintaining a temperature of the solution at 40° C., a 2% methanol solution of sodium hydroxide was added for its ratio to be 11% by mmol based on the total amount of vinyl acetate and 3,4-diacetoxy-1-butene to conduct hydrolysis. As the hydrolysis proceeded, the hydrolyzed product was separated out and became particles at last. The obtained polyvinyl alcohol was collected by filtration, sufficiently washed with methanol, and dried in a hot air dryer to obtain a polyvinyl alcohol.

The hydrolysis degree of the obtained polyvinyl alcohol (I) was analyzed as an amount of alkali consumption required for hydrolysis of residual vinyl acetate and 3,4-diacetoxy-1-butene to find 99.2% by mol, the average polymerization degree was analyzed in accordance with JIS K 6726 to find 900. Also, the viscosity of the polyvinyl alcohol in a 4% aqueous solution was measured by a Hoppler viscometer to find 9.5 mPa·s (20° C.), an introduction amount of 1,2-glycol bonds was measured by $^1$H-NMR (internal standard substance: tetramethylsilane, solvent: d6-DMSO) and calculated to be 14.9% by mol. Also, the polyvinyl alcohol (II) [partly hydrolyzed product (the degree of hydrolysis of 87.8% by mol)] was obtained by sampling in a process of hydrolysis. The obtained polyvinyl alcohols (I) and (II) were evaluated in the same manner as in Example 1. The evaluation results are shown in Table 1.

Comparative Example 1

A polyvinyl alcohol having a 1,2-glycol bond in a side chain was obtained and evaluated in the same manner as in Example 1 except that vinyl ethylene carbonate shown in the following formula (2) was used instead of 3,4-diacetoxy-1-butene.

Additionally, waste liquid after completion of hydrolysis was examined in the same method as in Example 1 to detect a large amount of dimethyl carbonate, it was necessary to have a hydrolysis process of dimethyl carbonate in the solvent recovery process.

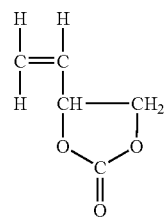
(2)

The hydrolysis degree of the obtained polyvinyl alcohol (I) was analyzed as an amount of alkali consumption required for hydrolysis of residual vinyl acetate unit to find 99.5% by mol, an average polymerization degree was analyzed in accordance with JIS K 6726 to find 1220. Also, a viscosity of the polyvinyl alcohol in a 4% aqueous solution was measured by a Hoppler viscometer to find 15.1 mPa·s (20° C.), an introduction amount of 1,2-glycol bonds was measured by $^1$H-NMR (internal standard substance: tetramethylsilane, solvent: d6-DMSO) and calculated to be 2.8% by mol. Also, the polyvinyl alcohol (II) [partly hydrolyzed product (the hydrolysis degree of 81.9% by mol)] was obtained by sampling in a process of hydrolysis. The obtained polyvinyl alcohols (I) and (II) were evaluated in the same manner as in Example 1. The evaluation results are shown in Table 1.

Comparative Example 2

Preparation of a polyvinyl alcohol having a 1,2-glycol bond in a side chain of 15% by mol was tried in the same manner as in Comparative Example 1 except for satisfying a relation of S/M=0.05 (S: methanol (50 g), M: vinyl acetate (1000 g), polymerization ratio of 70%) and charging 205 g (15.5% by mol) of vinyl ethylene carbonate.

Though a copolymer was obtained, but, when residual unreacted vinyl acetate was removed after completion of polymerization while charging methanol, there arose a problem that the polymer was precipitated in methanol.

Also, precipitation of the copolymer into a methanol solvent was observed in hydrolysis of the copolymer, inhomogeneous hydrolysis was not avoided. Also, waste liquid after completion of the hydrolysis was examined in the same method as in Example 1 to detect a large amount of dimethyl carbonate, it was necessary to have a hydrolysis process of dimethyl carbonate in the solvent recovery process.

A hydrolysis degree of the obtained polyvinyl alcohol (I) was analyzed as an amount of alkali consumption required for hydrolysis of residual vinyl acetate unit to find 99.5% by mol, an average polymerization degree was analyzed in accordance with JIS K 6726 to find 720. Also, the viscosity of the polyvinyl alcohol in a 4% aqueous solution was measured by a Hoppler viscometer to find 7.5 mPa·s (20° C.), an introduction amount of 1,2-glycol bonds was measured by $^1$H-NMR (internal standard substance: tetramethylsilane, solvent: d6-DMSO) and calculated to be 15% by mol. Also, the polyvinyl alcohol (II) [partly hydrolyzed product (hydrolysis degree of 85.1% by mol)] was obtained by sampling in a process of hydrolysis. The obtained polyvinyl alcohols (I) and (II) were evaluated in the same manner as in Example 1. The evaluation results are shown in Table 1.

TABLE 1

| | Solubility Polyvinyl alcohol | |
|---|---|---|
| | (I) | (II) |
| Ex. 1 | ○ | ○ |
| Ex. 2 | ○ | ○ |
| Ex. 3 | ○ | ○ |
| Ex. 4 | ○ | ○ |
| Com. Ex. 1 | Δ | x |
| Com. Ex. 2 | Δ | x |

Example 5

Using the polyvinyl alcohols (I) and (II) obtained in Example 1, a two-liquid type adhesive was prepared in the following manner.
[Preparation of Two-Liquid Type Adhesive]
The following base resin (aqueous emulsion with solid content of 43.5%) and a curing agent (multivalent isocyanate compound) were prepared.
(Base Resin)
15% aqueous solution of polyvinyl alcohol (I) or (II): 40 parts
Emulsion of styrene-butadiene copolymer with solid content of 50% ("DL612" available from Asahi Kasei Corporation): 35 parts
Calcium carbonate: 20 parts
Water: 5 parts
(Curing Agent)
MDI (content of NCO group of $6.71 \times 10^{-3}$ mol/g): 9.72 parts
Then, the two-liquid type adhesive prepared above was mixed with stirring, and the following evaluations were carried out. The evaluation results are shown in Table 2.
(Adhesion Strength in Normal Conditions)
On one surface of two pieces of birch board having straight grain (10 mm×25 mm×30 mm), the above adhesive was applied so as to be 100±10 g/m², both applied surfaces were stuck and pressed with a pressure of 8 kg/cm² for 12 hours, then adhesion strength was measured in accordance with JIS K 6852.
(Initial Adhesion Strength)
Both surfaces of birch wood were stuck in the same manner as in the above description (adhesion strength in normal conditions), and pressed with a pressure of 8 kg/cm² for 5 minutes or 10 minutes, then adhesion strength was measured in accordance with JIS K 6852.
(Endurance Adhesion Strength)
An adhesion sample was prepared in the same manner as in the above description (adhesion strength in normal conditions), after aging at 25° C. for 6 days, it was immersed in boiling water for 5 hours, dried in air at 60° C. for 24 hours, further, immersed in boiling water for 4 hours, then, was left to stand till being cooled in water of a room temperature, taken out from water, and immediately after that, adhesion strength (still in wet) was measured in accordance with JIS K 6852.

Examples 6 to 8

Using the polyvinyl alcohols (I) and (II) obtained in Example 2 (Example 6) to Example 4 (Example 8), the evaluations were carried out in the same manner as in Example 5. The evaluation results are shown in Table 2.

Comparative Example 3

Two kinds of polyvinyl alcohols were obtained in the same manner as in Example 1 except that 3,4-diacetoxy-1-butene was not used, only vinyl acetate was polymerized (S/M=0.5: S:methanol (500 g), M: vinyl acetate (1000 g)) and hydrolyzed.
The hydrolysis degree of the obtained polyvinyl alcohols were analyzed as amounts of alkali consumption required for hydrolysis of residual vinyl acetate unit to find 99.1% by mol (the polyvinyl alcohol (I)) and 88.2% by mol (the polyvinyl alcohol (II)), an average polymerization degree was analyzed in accordance with JIS K 6726 to find 1200.
Using the obtained polyvinyl alcohols, the evaluations were carried out in the same manner as in Example 5. The evaluation results are shown in Table 2.

TABLE 2

| | Adhesion strength in normal conditions | Initial adhesion strength | | Endurance adhesion strength |
|---|---|---|---|---|
| | | after 5 min. | after 10 min. | |
| Ex. 1 | 194/210 | 41/51 | 53/58 | 119/123 |
| Ex. 2 | 215/222 | 50/53 | 63/65 | 127/131 |
| Ex. 3 | 245/270 | 52/62 | 63/72 | 137/141 |
| Ex. 4 | 295/310 | 83/91 | 96/101 | 175/210 |
| Com. Ex. 3 | 130/180 | 21/27 | 29/36 | 51/54 |

Example 9

Using the polyvinyl alcohol (I) obtained in Example 1, after a film was prepared in the following manner, the film was evaluated for cold water solubility, alkali resistance and chemical resistance in the following manner. The evaluation results are shown in Table 3.
(Preparation of Film)
A 15% aqueous solution of the polyvinyl alcohol (I) was prepared, 15 parts of glycerin was added based on 100 parts of the polyvinyl alcohol (I), and flow-cast on a heated roll of 70° C. to obtain a film having a thickness of 50 μm.
(Cold Water Solubility)
The above film (3 cm×3 cm) was immersed in 1000 ml of water at 10° C., and a time till the film was completely dissolved while stirring was measured.

(Alkali Resistance)
Sodium carbonate was packed with a 10 cm×15 cm bag prepared by heat sealing the above film, left to stand in the condition of 40° C.×85 RH % for half a year, then, a piece of 3 cm×3 cm film was sampled from the bag, immersed in 1000 ml of water at 15° C., and a time till the film was completely dissolved while stirring was measured.
(Chemical Resistance)
It was evaluated in the same manner as the above description (alkali resistance) except that trichloroisocyanuric acid was used instead of sodium carbonate.

Examples 10 to 12 and Comparative Example 4

Using the polyvinyl alcohol (I) obtained in Example 2 (Example 10) to Example 4 (Example 12) and Comparative Example 3 (Comparative Example 4), the evaluations were conducted in the same manner as in Example 9. The evaluation results were shown in Table 3.
Additionally, in Comparative Example 4, a film only swelled and did not dissolve in any evaluation.

TABLE 3

| | Cold water solubility (sec.) | Alkali resistance (sec.) | Chemical resistance (sec.) |
|---|---|---|---|
| Ex. 9 | 30 | 39 | 35 |
| Ex. 10 | 27 | 31 | 33 |
| Ex. 11 | 20 | 21 | 24 |
| Ex. 12 | 12 | 16 | 18 |
| Com. Ex. 4 | swelling only | swelling only | swelling only |

INDUSTRIAL APPLICABILITY

The polyvinyl alcohol of the present invention having a 1,2-glycol bond in a side chain is obtained by copolymerizing a compound shown in the formula (1) with a vinyl ester monomer, so that there is no generation of dimethyl carbonate in the preparation thereof, no need of an eliminating process of dimethyl carbonate in the recovering process of waste liquid after hydrolysis. Also, even when an introduction amount of 1,2-glycol bonds is increased, there is no deterioration of solubility in a hydrolyzing solution (methanol) of a copolymer (paste) before hydrolysis, thus, it can be commercially produced in very useful method, further, it has a feature that the obtained polyvinyl alcohol (particularly partly hydrolyzed product) does not generate water-insoluble part even in experiencing thermal history, it is useful in workability and product quality in various applications of conventional polyvinyl alcohol, particularly useful in the applications relating to adhesives, molded articles, coating agents, emulsifiers and suspending agents, in particular, it is useful for water soluble packaging material such as alkali detergent package or for adhesive application of woodwork adhesive, above all, soft wood plywood.

The invention claimed is:
1. An aqueous polyvinyl alcohol having a 1,2-glycol bond in a side chain obtained by hydrolyzing a copolymer of vinyl acetate and 3,4-diacetoxy-1-butene,
wherein the hydrolysis degree of the polyvinyl alcohol is at least 60% by mol and less than or equal to 99.6% by mol,
wherein the ratio of structural units derived from 3,4-diacetoxy-1-butene to structural units derived from vinyl acetate is from 0.1:100 to 20:100.
2. The aqueous polyvinyl alcohol of claim 1, wherein the hydrolysis degree is at least 99.0% by mol.

3. The aqueous polyvinyl alcohol of claim 1, wherein the hydrolysis degree is less than 99.0% by mol.

4. A process for preparing an aqueous polyvinyl alcohol having a 1,2-glycol bond in a side chain,
   wherein a copolymer of vinyl acetate and 3,4-diacetoxy-1-butene is hydrolyzed such that the hydrolysis degree of the polyvinyl alcohol is at least 60% by mol,
   wherein the polyvinyl alcohol either does not contain structural units derived from ethylene, or contains from about 0.5 to 10% by mol of structural units derived from ethylene.

5. The process for preparing an aqueous polyvinyl alcohol of claim 4, wherein the hydrolysis degree is at least 99.0% by mol.

6. The process for preparing an aqueous polyvinyl alcohol of claim 4, wherein the hydrolysis degree is less than 99.0% by mol.

7. The process for preparing an aqueous polyvinyl alcohol of claim 4, wherein the ratio of structural units derived from 3,4-diacetoxy-1-butene to structural units derived from vinyl acetate is from 0.1:100 to 20:100.

* * * * *